United States Patent Office 3,081,336
Patented Mar. 12, 1963

3,081,336
1-ARALKYLCYCLOPROPYLAMINES AND CARBAMATES
Carl Kaiser, Haddon Heights, N.J., and Charles L. Zirkle, Berwyn, Pa., assignors to Smith Kline & French Laboratories, Philadelphia, Pa., a corporation of Pennsylvania
No Drawing. Filed Feb. 27, 1961, Ser. No. 91,652
8 Claims. (Cl. 260—471)

This invention relates to novel 1-aralkylcyclopropylamines which have useful pharmacodynamic properties. More specifically, these compounds exhibit activity resembling that of amphetamine and thus are useful as anorectics and central nervous system stimulants. This is in marked distinction from 2-arylcyclopropylamine derivatives which are monoamine oxidase inhibitors and are thus useful as antidepressants.

The novel 1-aralkylcyclopropylamines of this invention are represented by the following basic structural formula:

*Formula I*

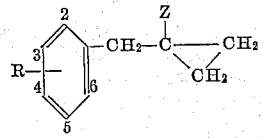

when:
R represents hydrogen, halogen of atomic weight less than 80, preferably chlorine, methyl, methoxy or trifluoromethyl, in positions 2, 3 or 4; and
Z represents amino, monomethylamino, dimethylamino, carbobenzoxyamino, carbethoxyamino, formylamino or β-hydroxyethylamino.

Advantageous compounds of this invention are represented by the following basic structural formula:

*Formula II*

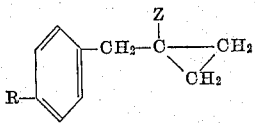

when:
R represents hydrogen, chlorine, methyl or trifluoromethyl; and
Z represents amino, dimethylamino, carbobenzoxyamino or formylamino.

A preferred compound of this invention is 1-benzylcyclopropylamine.

This invention also includes acid addition salts of the above defined bases formed with nontoxic pharmaceutically acceptable organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in an aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, cyclohexyl sulfamic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course these salts may also be prepared by the classical method of double decomposition of appropriate salts which is well-known to the art.

The novel 1-aralkylcyclopropylamines of this invention are prepared according to the following synthetic scheme:

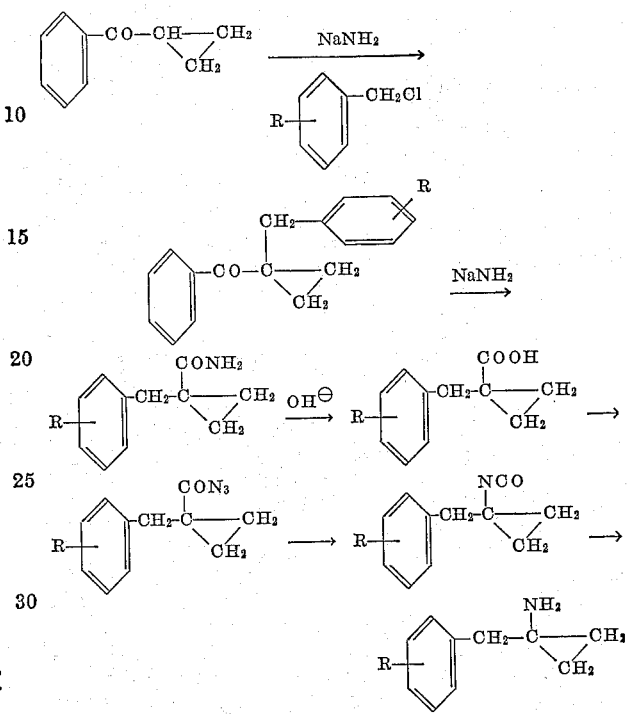

Thus, cyclopropyl phenyl ketone is refluxed in an inert solvent such as benzene or toluene with sodamide for from 4–8 hours and then with a benzyl halide, preferably chloride or bromide, for from 4–12 hours. The resulting 1-benzoyl-1-benzylcyclopropane is then refluxed for from 4–8 hours in a similar solvent with sodamide to give 1-benzylcyclopropanecarboxamide. The latter compound is hydrolyzed to the acid by refluxing for from 12–36 hours in an alcoholic or ethylene glycol solution of an alkali metal hydroxide such as potassium or sodium hydroxide. The 1-benzylcyclopropanecarboxylic acid is converted to a mixed anhydride by reaction with ethyl chloroformate in the presence of triethylamine and the anhydride is converted to the azide by treatment with an aqueous solution of sodium azide at 0–10° C. The azide is then subjected to the general reaction conditions employed in the Curtius rearrangement, namely heating on a steam bath in an unreactive organic solvent, for example toluene, for 1–3 hours to yield the isocyanate. The latter compound is hydrolyzed by refluxing in hydrochloric acid solution. Basification and extraction into ether subsequently yields the substituted 1-benzylcyclopropylamine free base which may be converted to salts as described herein above.

The compounds of Formula I above where Z represents dimethylamino, carbobenzoxyamino, carbethoxyamino or formylamino are prepared readily from the corresponding primary amines (Z is amino). The dimethylamino derivatives are obtained by methylation of the primary amine with a mixture of aqueous formaldehyde and formic acid. The carbobenzoxyamino and carbethoxyamino derivatives are prepared from the primary amine by reaction with benzyl chloroformate and ethyl chloroformate, respectively, at 0° C. in the presence of sodium hydroxide. The formylamino derivatives are prepared from the primary amine by refluxing with ethyl formate for from 12–24 hours.

The monomethylamino derivatives of Formula I are prepared from the intermediate isocyanate obtained as described above from the Curtius rearrangement of the azide, by reducing with lithium aluminum hydride in a refluxing ether solution.

The monomethylamino derivatives are also alternatively prepared by other methods. Thus, the corresponding formylamino compound obtained as above is reacted with sodium amide or a suspension of sodium hydroxide or hydride in mineral oil to give the sodio derivative which is alkylated with methyl iodide to give the N-methyl-N-formylamine. This compound is then hydrolyzed in hydrochloric acid solution to give the monomethylamine. Also, the primary amine is refluxed with benzaldehyde in absolute ethanol, the formed benzalamine is heated with methyl iodide in a sealed container at from 100–150° C. and the latter reaction product is refluxed in ethanol for several hours to give the monomethylamine.

The β-hydroxyethylamino derivatives of Formula I are prepared by alkylation of the corresponding primary amine with one equivalent of either ethylene halohydrin, preferably bromohydrin, or ethylene oxide. An acid binding agent is advantageously employed with the halohydrin which may be either an excess of the primary amine or an alkali metal carbonate, preferably potassium carbonate.

The foregoing is a general description of the main synthetic routes in the preparation of 1-aralkylcyclopropylamines. It will be readily apparent to one skilled in the art that variations in the choice of substituted benzyl halides are possible as well as variations in the preparative procedures herein described. Thus the general Formula I embraces compounds such as 3,4-dichloro- or 3,4,5-trimethoxybenzyl derivatives as obvious equivalents. The following examples further illustrate the procedures for the preparation of compounds of this invention. These examples are of course not to be construed as limiting but rather illustrative of the compounds embraced by Formula I.

*Example 1*

To a stirred suspension of 29.5 g. of sodamide in 700 ml. of dry benzene, under an atmosphere of nitrogen, is added 103 g. of cyclopropyl phenyl ketone. The mixture is stirred and refluxed for six hours. The solution is cooled, 103 ml. of benzyl chloride is added and refluxing is continued for eight hours. The cooled mixture is treated with 150 ml. of water and extracted with ether. The dried extract is evaporated and the residual oil distilled under reduced pressure to give 1-benzoyl-1-benzyl-cyclopropane, B.P. range 140–168° C./0.3–0.6 mm.

To a suspension of 10.7 g. of sodamide in 450 ml. of moist benzene is added 58.7 g. of 1-benzoyl-1-benzyl-cyclopropane and the stirred mixture is refluxed for six hours. The cooled mixture is treated with 350 ml. of water and extracted with ether. The organic extract is washed with water and then a saturated salt solution, dried and evaporated. The residual oil crystallizes on cooling and is recrystallized from ethyl acetate-petroleum ether to yield 1-benzylcyclopropanecarboxamide, M.P. 77–81° C.

A solution of 40 g. of potassium hydroxide in 300 ml. of ethylene glycol and 5 ml. of water is treated with 25.1 g. of 1-benzylcyclopropanecarboxamide. The stirred mixture is refluxed for 16 hours, cooled, diluted with 500 ml. of water and extracted with ether. The aqueous solution is filtered through Super-Cel and the filtrate acidified. The precipitate is filtered, washed and dried to give 1-benzylcyclopropanecarboxylic acid, M.P. 103–105.5° C.

A solution of 20.1 g. of 1-benzylcyclopropanecarboxylic acid in 100 ml. of acetone and 20 ml. of water, cooled to 0° C., is treated with a solution of 19.2 g. of triethylamine in 50 ml. of acetone, with stirring. After about five minutes a solution of 20.6 g. of ethyl chloroformate in 50 ml. of acetone is added, maintaining the temperature below 10° C. After 30 minutes a solution of 14.8 g. of sodium azide in 50 ml. of water is added to the solution of the mixed anhydride and stirring is continued in the cold for 90 minutes. The reaction mixture is then poured into 1 l. of ice-water, extracted with ether and the dried extract evaporated in vacuo at 25° C. The residual azide is dissolved in 125 ml. of dry toluene and the solution cautiously warmed on the steam bath and then refluxed for one hour. The toluene is removed to leave the oily isocyanate. To this oil is added 200 ml. of 20% hydrochloric acid solution and the mixture stirred and refluxed for 90 minutes. The solvent is removed in vacuo and the residue taken up in 250 ml. of water. The solution is extracted with methylene chloride, basified with 40% sodium hydroxide solution and then extracted with ether. The dried extract is evaporated to give 1-benzylcyclopropylamine.

The oily amine is dissolved in isopropanol and made acidic with ethereal hydrogen chloride solution. The precipitated 1-benzylcyclopropylamine hydrochloride is filtered, dried and recrystallized to melt at 157.5–159° C.

*Example 2*

To a suspension of 1.1 g. of lithium aluminum hydride in 50 ml. of dry ether is added a solution of 5.0 g. of 1-benzylcyclopropane isocyanate (prepared as described in Example 1) in 40 ml. of ether. The mixture is stirred and refluxed for four hours. After cooling, the reaction mixture is treated successively with 1 ml. of water, 1 ml. of 10% sodium hydroxide solution and 4 ml. of water and is stirred for 30 minutes. The filtered precipitate is washed with ether and the filtrate evaporated. The residual oil is distilled under reduced pressure to give 1-benzyl-N-methylcyclopropylamine, B.P. 55–60° C./0.5–1.0 mm.

The oil is dissolved in ethanol and made acidic with ethereal hydrogen chloride solution. Ether is then added to precipitate 1-benzyl-N-methylcyclopropylamine hydrochloride.

*Example 3*

A suspension of 23.4 g. of sodamide in 500 ml. of benzene and 73.0 g. of cyclopropyl phenyl ketone is stirred and refluxed for six hours. The solution is treated with 121.0 g. of p-chlorobenzyl chloride in 500 ml. of benzene and refluxed for eight hours. Diluting with water following the procedure of Example 1 yields 1-benzoyl-1-(p-chlorobenzyl)-cyclopropane.

A suspension of 4.1 g. of sodamide in 250 ml. of moist benzene and 27.0 g. of 1-benzoyl-1-(p-chlorobenzyl)-cyclopropane is stirred and refluxed for six hours. The cooled reaction mixture is worked up as described in Example 1 to yield 1-(p-chlorobenzyl)-cyclopropanecarboxamide. The latter compound (20.9 g.) is refluxed with 18 g. of sodium hydroxide in 200 ml. of ethylene glycol and 5 ml. of water for 18 hours. Working up as in Example 1 yields 1-(p-chlorobenzyl)-cyclopropanecarboxylic acid.

The carboxylic acid (21.0 g.) in 100 ml. of acetone and 25 ml. of water, at 0° C., is treated with 17.2 g. of triethylamine in 50 ml. of acetone and then with 18.5 g. of ethyl chloroformate. The resulting solution of mixed anhydride is treated with 13.0 g. of sodium azide in 50 ml. of water. After stirring below 10° C. for two hours the reaction mixture is poured into ice-water. The extracted azide is dissolved in 150 ml. of toluene and heated on the steam bath for one hour to give the isocyanate after removal of solvent. The isocyanate is refluxed in 200 ml. of 20% hydrochloric acid solution to yield after extraction and basification the 1-(p-chlorobenzyl)-cyclopropylamine.

A sample of the amine is dissolved in ethyl acetate and an ethyl acetate solution of maleic acid is added to give the maleate salt.

Example 4

Substituting equivalent amounts of o-chlorobenzyl chloride, o- or p-bromobenzyl chloride or 3,4-dichlorobenzyl chloride for the p-chlorobenzyl chloride of Example 3 and subsequent reaction with 73.0 g. of cyclopropyl phenyl ketone and the ensuing reaction steps as fully described in Examples 1 and 3, yields the corresponding 1-(o-chlorobenzyl) - cyclopropylamine, 1-(o-bromobenzyl)-cyclopropylamine, 1-(p-bromobenzyl)-cyclopropylamine and 1-(3,4-dichlorobenzyl)-cyclopropylamine.

Example 5

A suspension of 18.7 g. of sodamide in 500 ml. of dry benzene is stirred and refluxed for six hours with 58.5 g. of cyclopropyl phenyl ketone. The solution is then treated with 84.0 g. of o-xylyl chloride and refluxed for eight hours. Working up as in Example 1 gives 1-benzoyl-1-(o-xylyl)-cyclopropane. This compound (20.0 g.) is stirred and refluxed for six hours with 3.5 g. of sodamide in 200 ml. of moist benzene to give upon workup 1-(o-xylyl)-cyclopropanecarboxamide. The carboxamide (18.9 g.) is refluxed with 16.0 g. of sodium hydroxide in 175 ml. of ethylene glycol and 3.5 ml. of water for 20 hours to give 1-(o-xylyl)-cyclopropanecarboxylic acid following the procedure of Example 1.

A solution of the carboxylic acid (9.5 g.) in 50 ml. of acetone and 15 ml. of water, cooled to 0° C., is treated with 8.6 g. of triethylamine in 30 ml. of acetone and then with 9.2 g. of ethyl chloroformate. The mixture is stirred for 30 minutes with the temperature maintained below 10° C. and then 6.5 g. of sodium azide in 25 ml. of water is added. This mixture is stirred in the cold for 90 minutes, poured into ice-water and extracted with ether to yield the azide. A solution of the azide in 75 ml. of dry toluene is heated on the steam bath until the evolution of nitrogen ceases (one hour). Removal of the toluene leaves the isocyanate which is refluxed in 100 ml. of 20% hydrochloric acid solution to give after working up as in Example 1, 1-(o-xylyl)-cyclopropylamine.

Treating the free base with cyclohexyl sulfamic acid gives the corresponding cyclohexyl sulfamate salt.

Similarly, by employing 84.0 g. of m- or p-xylyl chloride in the above procedure and completing the analogous reaction sequence there is obtained the corresponding isomeric 1-(m-xylyl)- and 1-(p-xylyl)-cyclopropylamines.

Example 6

To a suspension of 28.1 g. of sodamide in 650 ml. of dry benzene is added 87.5 g. of cyclopropyl phenyl ketone and the mixture is stirred and refluxed for six hours. To the cooled solution is added 140.8 g. of p-methoxybenzyl chloride and refluxing is continued for eight hours. Working up as described in Example 1 yields 1-benzoyl-1-(p-methoxybenzyl)-cyclopropane. This compound (25.0 g.) is stirred and refluxed for six hours with 4.0 g. of sodamide in 250 ml. of moist benzene to give 1-(p-methoxybenzyl)-cyclopropanecarboxamide. The carboxamide (20.5 g.) is refluxed with 16.0 g. of sodium hydroxide in 200 ml. of ethylene glycol and 5 ml. of water for 18 hours to give after workup as in Example 1, 1-(p-methoxybenzyl)-cyclopropanecarboxylic acid.

A solution of 20.6 g. of the cyclopropanecarboxylic acid thus prepared in 100 ml. of acetone and 20 ml. of water, cooled to 0° C., is treated with 17.2 g. of triethylamine in 50 ml. of acetone and then 18.5 g. of ethyl chloroformate in 50 ml. of acetone. Maintaining the temperature below 10° C., a solution of 13.0 g. of sodium azide in 50 ml. of acetone is added and the mixture stirred for two hours. Working up the reaction mixture as described in Example 1 yields the azide which is then dissolved in 125 ml. of dry toluene and heated on the steam bath for 90 minutes. Removal of the solvent gives the isocyanate. The latter compound is refluxed for two hours in 200 ml. of 20% hydrochloric acid solution and worked up as described in Example 1 to yield 1-(p-methoxybenzyl)-cyclopropylamine.

Treatment of the free base in absolute ether with anhydrous hydrogen bromide gas gives the corresponding hydrobromide salt.

Similarly by employing an equivalent amount of 3,4,5-trimethoxybenzyl chloride in the above reaction procedure there is obtained the corresponding 1-(3,4,5-trimethoxybenzyl)-cyclopropylamine.

Example 7

A mixture of 23.4 g. of sodamide and 73.0 of cyclopropyl phenyl ketone in 500 ml. of dry benzene is stirred and refluxed for six hours. To this solution is added 179.0 g. of p-trifluoromethylbenzyl bromide and 500 ml. of dry benzene. Refluxing is continued for six hours and the reaction mixture worked up as in Example 1 to give 1-benzoyl-1-(p-trifluoromethylbenzyl)-cyclopropane. This compound (30.3 g.) is stirred and refluxed for six hours with 4.2 g. of sodamide in 300 ml. of moist benzene to give 1-(p-trifluoromethylbenzyl)-cyclopropanecarboxamide. The latter compound (24.2 g.) is refluxed with 16.0 g. of sodium hydroxide in 200 ml. of ethylene glycol and 5 ml. of water for 16 hours to give after working up as described in Example 1, 1-(p-trifluoromethylbenzyl)-cyclopropanecarboxylic acid.

A solution of 12.2 g. of this carboxylic acid in 60 ml. of acetone and 15 ml. of water, cooled to 0° C., is treated with 8.6 g. of triethylamine in 25 ml. of acetone and then with 9.2 g. of ethyl chloroformate in 25 ml. of acetone. With the temperature below 10° C., the mixture is stirred for 30 minutes and then a solution of 6.5 g. of sodium azide in 25 ml. of water is added. After two hours the reaction mixture is poured into ice-water and extracted with ether to yield subsequently the corresponding acid azide. The latter compound is dissolved in 75 ml. of dry toluene and heated on the steam bath for one hour. The solvent is then removed to give the isocyanate which is refluxed in 100 ml. of 20% hydrochloric acid solution for two hours. Working up the reaction mixture as described in Example 1 yields 1-(p-trifluoromethylbenzyl)-cyclopropylamine.

Treating the free base in isopropanol solution with ethereal hydrogen chloride solution yields the corresponding hydrochloride salt.

Similarly employing 179.0 g. of o- or m-trifluoromethylbenzyl bromide in the above procedures yields the isomeric 1 - (o - trifluoromethylbenzyl)-cyclopropylamine and 1-(m-trifluoromethylbenzyl)-cyclopropylamine.

Example 8

A 40% aqueous solution of formaldehyde (5.1 g.) is added to a cooled solution of 3.0 g. of 1-benzylcyclopropylamine (prepared as in Example 1) in 6.6 g. of 90% formic acid and the mixture refluxed for 18 hours. The cooled reaction mixture is treated with 2.7 ml. of concentrated hydrochloric acid and the solution evaporated in vacuo. The residue is made alkaline with 50% potassium hydroxide solution and the solution extracted with ether. Evaporation of the dried ether extract yields 1-benzyl-N,N-dimethylcyclopropylamine.

Example 9

A stirred mixture of 12.0 g. of sodium hydroxide, 48.2 g. of 1-(o-oxylyl)-cyclopropylamine (prepared as in Example 5) and 50 ml. of water is cooled to 0° C. and 32.5 g. of ethyl chloroformate is added dropwise at a rate to maintain the temperature below 20° C. After the addition is complete, the reaction mixture is stirred for 30 minutes at 0° C., extracted with ether and the dried extract is concentrated to give 1-(o-oxylyl)-N-carbethoxycyclopropylamine.

Example 10

A stirred mixture of 12.0 g. of sodium hydroxide, 44.0 g. of 1-benzylcyclopropylamine (prepared as in Example 1) and 50 ml. of water is cooled to 0° C. and 51.2 g. of benzyl chloroformate is added dropwise, maintaining the temperature below 20° C. When the addition is complete, stirring is continued for 30 minutes at 0° C. The reaction mixture is extracted with ether and the dried extract concentrated to give 1-benzyl-N-carbobenzoxy-cyclopropylamine.

*Example 11*

A solution of 21.5 g. of 1-(p-trifluoromethylbenzyl)-cyclopropylamine (prepared as in Example 7) and 125 ml. of ethyl formate is refluxed for 17 hours. The excess ethyl formate is evaporated in vacuo to give 1-(p-trifluoromethylbenzyl)-N-formylcyclopropylamine.

*Example 12*

To a solution of 14.7 g. of 1-benzylcyclopropylamine in 100 ml. of methanol is added a solution of 4.4 g. of ethylene oxide in 50 ml. of methanol. After standing at 25° C. for 16 hours, the solution is refluxed for two hours. The methanolic solvent is evaporated and the residual oil is fractionally distilled to give 1-benzyl-N-(β-hydroxyethyl)-cyclopropylamine, which is readily converted to the hydrochloride salt.

What is claimed is:
1. Chemical compounds of the class consisting of a free base and its nontoxic pharmaceutically acceptable acid addition salts, said free base having the formula:

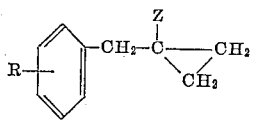

in which R is a member selected from the group consisting of hydrogen, halogen of atomic weight less than 80, methyl, methoxy and trifluoromethyl; and Z is a member selected from the group consisting of amino, monomethylamino, dimethylamino, carbobenzoxyamino, carbethoxyamino, formylamino and β-hydroxyethylamino.

2. A chemical compound having the formula:

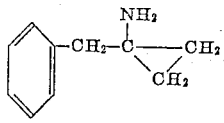

3. A chemical compound having the formula:

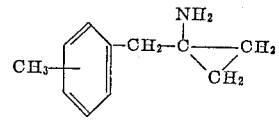

4. 1-(o-xylyl)-cyclopropylamine.
5. A chemical compound having the formula:

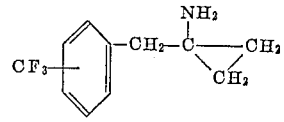

6. 1-(p-trifluoromethylbenzyl)-cyclopropylamine.
7. A chemical compound having the formula:

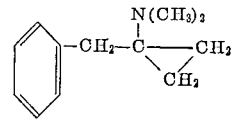

8. A chemical compound having the formula:

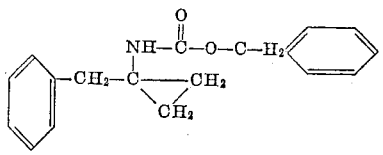

References Cited in the file of this patent
UNITED STATES PATENTS 2,934,542    Burgher _____ Apr. 26, 1960
2,954,395    Shapiro et al. _____ Sept. 27, 1960

OTHER REFERENCES

Bunce et al., J. Am. Chem. Soc., 76, 2248—8 (1954).